Patented July 22, 1924.

1,502,645

UNITED STATES PATENT OFFICE.

FRANTS DJÖRUP, OF CHICAGO, ILLINOIS.

COMPOSITION FLOORS.

No Drawing.   Application filed December 23, 1921.   Serial No. 524,493.

*To all whom it may concern:*

Be it known that I, FRANTS DJÖRUP, a citizen of the United States, residing at Chicago, county of Cook, and State of Illinois, have invented a new and useful Improvement in Composition Floors, of which the following is a specification.

This invention relates to composition floors, and particularly pertains to such floors as contain a product popularly known as magnesite, and from which such floors obtain their name.

It is the primary object of this invention to provide a composition flooring material which may consist of magnesite and other constituents combined in proper proportions to afford an improved homogeneous mass of proper consistency to permit the same to be laid in semi-plastic state to form a floor; which when set and finished possesses a high degree of elasticity and durability; which is fire-resistent and will not buckle or crack under changes in temperature; and yet afford a composition floor which will readily expand and contract evenly under such changes in temperature as may prevail.

It is further an object of this invention to provide a composition flooring material which, while preferably employing magnesite as one of its principal constituents, may contain any other constituent in the place of magnesite which possesses the same qualities; and it is further an object to provide a composition employing constituents which readily combine with magnesite to produce the desired result, namely, a composition flooring material possessing elasticity and a high degree of durability.

Such other objects and advantages as may appear or be pointed out later, together with those already pointed out, are attained in the preferred combination of constituents described in detail hereinafter; the proportions of which are, of course, variable to suit different conditions.

Referring now to the composition and its constituents forming the subject matter of this invention, the composition preferably consists of magnesite, kieselguhr, silica flint powder, and a lime proof coloring which forms the "dry" part of the composition flooring material, these elements being combined in suitable proportions, which are preferably as follows:

|  | Parts. |
| --- | --- |
| Calcined magnesite powder | 60 |
| Kieselguhr | 30 |
| Silica | 5 |
| Flint powder | 5 |
| Lime proof coloring substance— sufficient quantity to secure the desired coloring effect. |  |

The foregoing constituents, as pointed out, complete the "dry" portion of the composition, the calcined magnesite being usually composed of magnesium oxide, carbon dioxide, and calcium oxide, and easily obtainable on the open market. Kieselguhr is a mineral readily obtainable in this country and is composed of flint oxide, and is indestructible and will undergo all temperatures. Its use is preferable to that of asbestos because asbestos cannot withstand such a high temperature, which runs 3400 and 3600 degrees F. Thus the temperature resistant property of a floor is materially increased by the use of kieselguhr.

The dry ingredients as described are thoroughly mixed either by grinding or in any other suitable manner to form a homogeneous mass and until at least 60 per cent of the mixture will pass a standard 80 mesh sieve.

The dry materials having thus been mixed are reduced to a plastic state by adding magnesium chloride, preferably 60 parts and having a hydrometer reading of 20.22 Baumé. The magnesium chloride, of course, is readily obtainable on the open market, and is added to the mixed dry materials until the proper plastic consistency is attained, whereupon the composition is complete and ready for use.

While the particular method employed in laying the composition to form a floor may be any approved method, the installation is usually carried out in the following manner: A concrete fill is provided and must be thoroughly set and clean of foreign particles before applying the composition floor. To secure a good bond between the composition and the concrete, and where the floor is to be greater in thickness than one-quarter inch, a coating of this composition of liquid consistency is applied a suitable period of time before the composition flooring is applied. Where the floor is to be not more than one-quarter of an inch in thickness, the same may consist entirely of the plastic composition as described. Certain building rules require two layers and, of course, this composition may be installed in accordance with existing rules governing such installations. These different methods of installation have been carefully considered by those familiar with building; are well-known to those skilled in the art, and forming no indispensable part of the present invention are not described here.

While this invention has been described as composed of a plurality of constituents in certain proportions, it is obvious that minor changes in proportions and manner of combining same may be made within the purview of the invention and scope of the claim.

I claim:

A composition flooring material or the like, consisting of calcined magnesite, sixty parts, kieselguhr, thirty parts, silica, five parts, flint, five parts, and magnesium chloride, sixty parts.

In testimony whereof, I affix my signature in the presence of two witnesses at 36 W. Randolph St., Chicago, Illinois.

FRANTS DJÖRUP.

Witnesses:
DANIEL A. BRENNAN,
FORREST B. SMITH.